United States Patent

Fueslein

[15] 3,643,743
[45] Feb. 22, 1972

[54] MECHANISM FOR OPENING AND CLOSING AN OFFSET DISK HARROW

[72] Inventor: Jerome L. Fueslein, Linden, Calif.
[73] Assignee: International Harvester Company, Chicago, Ill.
[22] Filed: Dec. 29, 1969
[21] Appl. No.: 888,687

[52] U.S. Cl............................172/320, 172/580, 172/582, 172/600
[51] Int. Cl...................................A01b 23/04, A01b 65/02
[58] Field of Search...............................37/103; 172/315–317, 320, 324, 569, 576, 613, 599, 600, 580, 582, 581, 584, 571, 572, 574, 591, 568, 596, 597, 589, 679, 667, 649, 662, 645, 442, 594, 483, 484

[56] References Cited

UNITED STATES PATENTS

| 3,519,085 | 7/1970 | Heckathorn et al. | 172/597 |
| 2,406,866 | 9/1946 | Thompson | 172/596 |
| 3,250,333 | 5/1966 | Day | 172/126 |
| 3,139,199 | 6/1964 | Auwelaer | 37/103 |
| 3,448,535 | 6/1969 | Haynes | 37/103 |
| 3,371,435 | 3/1968 | Miller | 37/103 |
| 2,626,552 | 1/1953 | Oehler et al. | 172/316 |
| 2,237,884 | 4/1941 | Lysedahl | 172/320 |
| 2,860,471 | 11/1958 | Welch | 172/568 |
| 2,334,455 | 11/1943 | Thomas | 172/320 |
| 2,759,312 | 8/1956 | Rasmussen et al. | 172/580 |
| 3,439,750 | 4/1969 | McKay | 172/581 |
| 2,608,813 | 9/1952 | Frank | 172/597 |
| 2,608,814 | 9/1952 | Frank | 172/596 |

Primary Examiner—Robert E. Pulfrey
Assistant Examiner—C. W. Hanor
Attorney—Floyd B. Horman

[57] ABSTRACT

An agricultural implement having front and rear gangs of earth-working tools being interconnected in such a manner that they may easily be adjusted from a transport to a field operating position and also be laterally adjusted with respect to each other to provide the proper tool relationship between said front and rear gangs of earth-working tools for various field operating conditions.

1 Claims, 4 Drawing Figures

PATENTED FEB 22 1972 3,643,743

INVENTOR
JEROME L. FUESLEIN

INVENTORS
JEROME L. FUESLEIN

MECHANISM FOR OPENING AND CLOSING AN OFFSET DISK HARROW

BACKGROUND AND SUMMARY OF THE INVENTION

The present invention relates to agricultural implements and particularly to disk harrows. Specifically, the invention relates to a disk harrow of the offset type. Disk harrows of the class contemplated by this invention comprise front and rear disk gangs interconnected at one end for horizontal swinging between a parallel or transport position and an angled or operating position. It is well recognized in the art that in order to provide for proper soil preparation, provisions must be made for laterally adjusting one of the gangs relative to the other to provide a smooth finished soil surface such that the rear disk gang fills the furrows created by the front disk gang. In the past, such lateral adjustments had to be made each time the operator changed in angled operating position of the harrow. Also, after any lateral adjustment was made the operator was unable to return the harrow gangs to a parallel or transport position without first repositioning a number of fasteners and complicated linkages used to move the gangs relative to each other to a position which would allow the gangs to come together in a parallel relationship for transport.

It is, therefore, an object of this invention to provide a means for moving the gangs of a disk harrow relative to each other while maintaining any preset lateral adjustment for various angled operating positions of the harrow.

It is also an object of this invention to provide means for moving the gangs of a disk harrow relative to each other such that for any amount of lateral adjustment the gangs will always return to a parallel relationship for transport.

DESCRIPTION OF THE PREFERRED EMBODIMENTS

Figure 1:
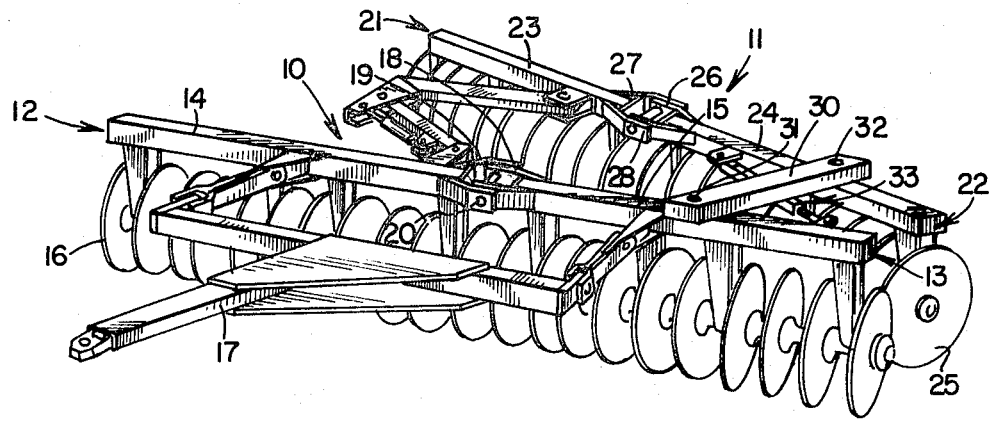
FIG. 1 is a perspective view of the disk harrow shown in an operating position.

In the drawings the numerals 10 and 11 refer, respectively, to the front and rear sections of a disk harrow. The front harrow section 10 consists of transversely aligned disk gang sections 12 and 13 comprising aligned supporting frame members 14 and 15 upon which is mounted a plurality of discs 16 the concave sides of which are directed to the right of the direction of travel in FIG. 1. The disk gang sections 10 and 11 are of conventional construction and are provided with a hitch structure 17 connected to frame members 14 and 15 for attachment to a tractive vehicle, not shown.

Gang sections 12 and 13 are flexibly connected, due to the substantial width of the implement and also to allow the implement to follow the contour of the ground, by the provision at their inner ends of clevises 18 and 19 mounted on a horizontal longitudinally extending pivot pin 20.

The rear disk gang 11 is constructed similarly to the front gang 10 and includes a pair of transversely aligned disk gang sections 21 and 22 comprising rear frame members 23 and 24 carrying a plurality of discs 25, the concave faces of which are directed to the left of the direction of travel in FIG. 1. The rear gang 11 is flexibly constructed in the same manner as the front gang 10 and clevises 26 and 27 are secured to the inner ends of rear frame members 23 and 24, respectively, and mounted upon a horizontal longitudinally extending pivot pin 28.

The front harrow section 10 and the rear harrow section 11 are interconnected at one end by beam member 30. The beam member 30 is pivotally connected to the front harrow section 10 by pivot member 31 and is pivotally connected to the rear harrow section 11 by pivot member 32.

Figure 2:
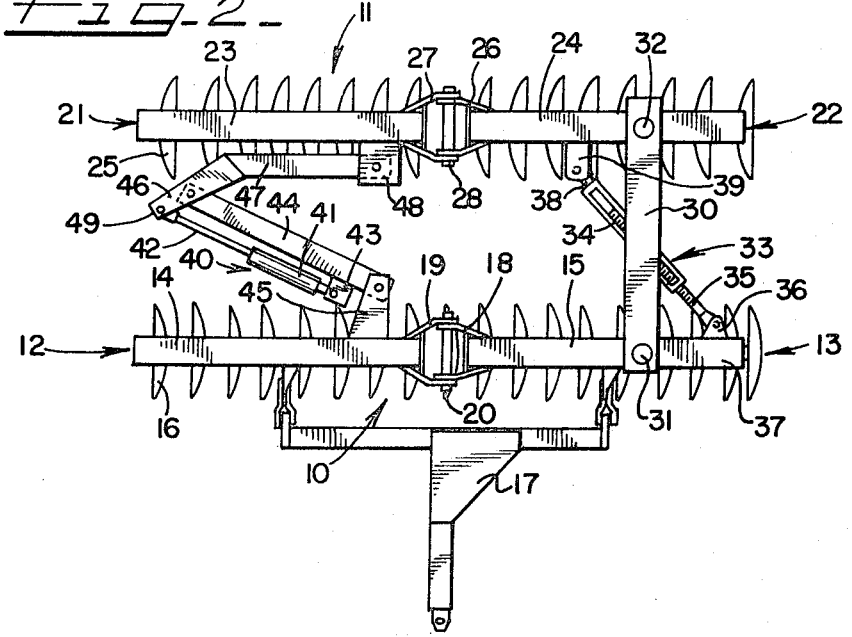
FIG. 2 is a plan view of the harrow equipped with this invention showing the parallel relationship of the front and rear disk gangs when the implement is in its transport position, and showing the improvement in the form of means for moving the gangs into an angled or operating position, after selecting the desired lateral adjustment, while preserving the desired alignment of the gangs fore and aft when they are moved back into the transport position.

To provide for the lateral adjustment between the front harrow section 10 and the rear harrow section 11, an adjustable length member 33 (as best shown in FIG. 2) in the form of a turnbuckle 34 has one end 35 pivotally mounted on a lug 36 secured to and projecting rearwardly from frame member 15 at a point substantially between the forward portion of beam member 30 and the end 37 of frame member 15. The other end 38 of turnbuckle 34 is pivotally mounted on a lug 39 secured to and projecting forwardly from frame member 24 at a point diagonally opposite from lug 36. Changing the length of the adjustable length member 33 laterally adjusts the rear harrow section 11 with respect to the front harrow section 10 because the front harrow section will remain stationary in that it is attached to a tractive vehicle, not shown, through the hitch structure 17. In this construction, the longitudinal axis of the adjustable length member 33 and the beam member 30 intersect forming an effective pivot point between the front harrow section 10 and the rear harrow section 11 causing the front harrow section angle A and the rear harrow section angle B, as shown in FIG. 3, to be proportional thereby maintaining the lateral adjustment, for proper disc relationship, for various selected angled operating positions such as shown in FIG. 3.

Figure 3:
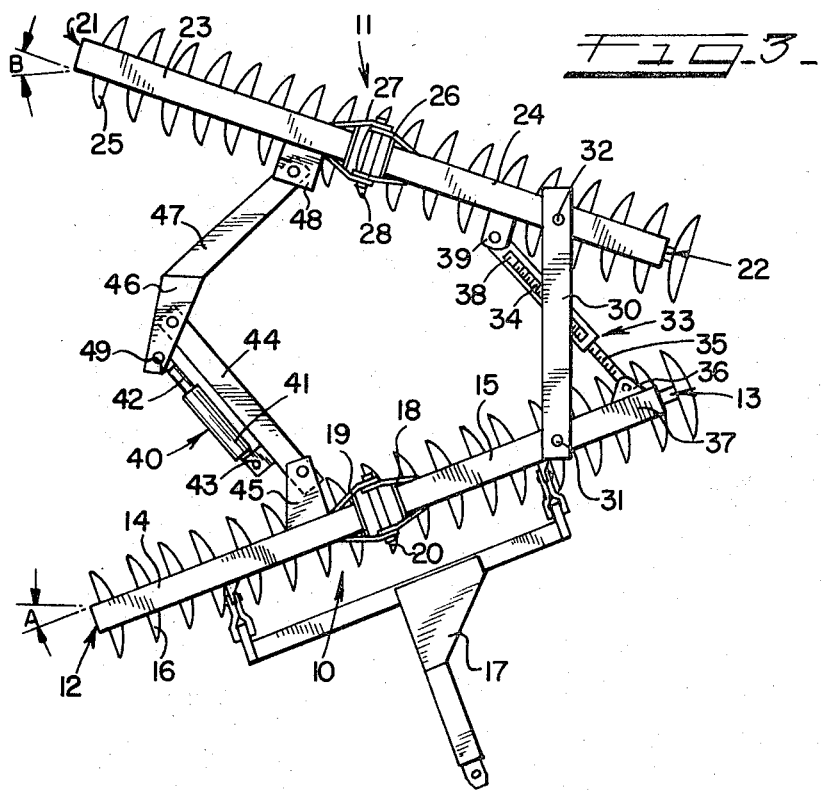
FIG. 3 is a plan view of the harrow shown in FIG. 2 but illustrating it in an angled operating position.
Figure 4:
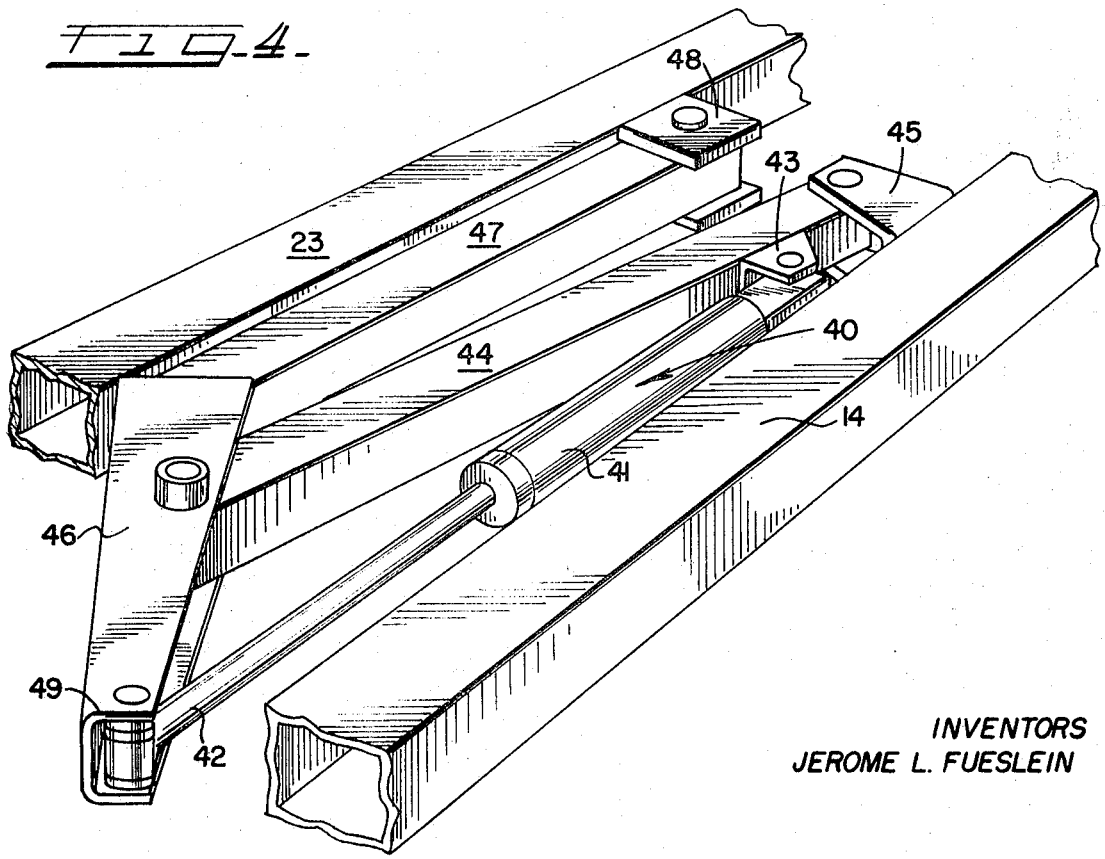
FIG. 4 is an enlarged fragmentary detail in perspective illustrating the power operated moving means while the gangs are in the parallel or transport position used to prevent the overclosing or underclosing of the disk gangs when the gangs are in a laterally adjusted position.

Control of the movement of the harrow sections 10 and 11 from a parallel or transport position to a selected angled operating position is accomplished, as best shown in FIGS. 2 and 3, by means of a flexible linking member including a hydraulic ram 40 comprising a cylinder 41 and a piston rod 42, and first and second horizontal links 44 and 47 respectively. The cylinder 41 of ram 40 is pivotally connected to a U-shaped bracket 43 which is affixed to a first horizontal link or bracing bar 44 which is pivotally mounted at one end to a U-shaped lug 45 secured to and projecting rearwardly from frame member 14. The other end of the first link 44 is pivotally attached to a U-shaped bracket 46 which is rigidly attached to one end of a second horizontal link or bracing bar 47. The opposite end of the second link 47 is pivotally attached to a U-shaped lug 48 secured to and projecting forwardly from the frame member 23. The piston rod 42 of the hydraulic ram 40 is pivotally attached to the end portion 49 of the arm 46. The arm 46 serves as a lever which will change the angle between the front and rear harrow sections 10 and 11 when the hydraulic ram 40 is actuated. FIG. 2 shows the front harrow section 10, comprising frame members 14 and 15, the rear harrow section 11, comprising frame members 23 and 24, in the parallel or transport position. In this position, the piston rod 42 of the ram 40 is extended. To change the operating angle between the front harrow section 10 and the rear harrow section 11 the piston rod is retracted until the desired angled operating position is reached, as shown in FIG. 3.

The novel flexible linking member described above is used to open and close a disk harrow from a parallel or transport position to an angled or operating position no matter how much the rear harrow section 11 has been laterally adjusted relative to the front harrow section 10. With a conventional disk harrow, the front and rear disk gangs would close to a parallel position for only one lateral adjustment of the rear gang relative to the front gang, unless means were provided to physically move whatever conventional linkage was used to control the operating angle between the front and rear disk gangs. Applicant's invention allows the rear gang to be laterally adjusted relative to the front gang and eliminates the requirement of the additional adjustment of the linkage used to control the opening and closing of the harrow gangs. Applicant's novel linkage is designed so that an imaginary line drawn between the front and rear pivot points located on brackets 45 and 48, respectively, is parallel to the longitudinal axis of the hinge member 30 so that for any amount of lateral adjustment the front and rear gangs will always remain parallel to each other when they are returned from the angles operating position to the parallel transport position.

What is claimed is:

1. In a disk harrow having front and rear disk gangs the combination comprising, a rigid member pivotally attached to and interconnecting said front and rear disk gangs, an adjustable member pivotally attached to and interconnecting said front and rear gangs proximately located with respect to said rigid member to laterally adjust the rear gang relative to the front gang, said adjustable member and said rigid member disposed within vertical planes which intersect between said gangs, a flexible linking member pivotally attached to and interconnecting said gangs at the opposite end of said gangs with respect to said rigid member, and adapted for horizontal swinging of said gangs from an angled or operating position to a parallel or transport position regardless of the amount of lateral adjustment between said front and rear gangs as provided by said adjustable member, said linking member comprising, a front beam pivotally attached at one end to said front gang, a hydraulic cylinder extending along having one end attached to said front beam and a rear beam pivotally attached at one end to said rear gang and having its other end pivotally connected to the unattached end of said front beam and said hydraulic cylinder.

* * * * *